United States Patent
Szela et al.

(10) Patent No.: US 7,401,513 B2
(45) Date of Patent: Jul. 22, 2008

(54) ELECTRONIC METHOD AND SYSTEM FOR DETECTION OF CONDUCTING OR DIELECTRIC MEDIUM WITH DIELECTRIC CONSTANT HIGHER THAN THAT OF AIR

(75) Inventors: Zbigniew Szela, Zabratowka (PL); Kazimierz Zajac, Rzeszow (PL); Wlodzimierz Kalita, Rzeszow (PL); Zbigniew Lasota, Warsaw (PL); Lasota Michal, Warsaw (PL)

(73) Assignee: Elektroniczny Zakkad Innowacyjno-Wdrozeniowy "Hybres" S.p. z o.o, Rzeszòw (PL)

( * ) Notice: Subject to any disclaimer, the term of this patent is extended or adjusted under 35 U.S.C. 154(b) by 128 days.

(21) Appl. No.: 10/545,129

(22) PCT Filed: Jan. 21, 2004

(86) PCT No.: PCT/PL2004/000003

§ 371 (c)(1), (2), (4) Date: Aug. 8, 2005

(87) PCT Pub. No.: WO2004/070774

PCT Pub. Date: Aug. 19, 2004

(65) Prior Publication Data

US 2006/0106547 A1    May 18, 2006

(30) Foreign Application Priority Data

Feb. 7, 2003    (PL) .................................... 358634

(51) Int. Cl.
   G01F 23/26    (2006.01)

(52) U.S. Cl. .................................. 73/304 C

(58) Field of Classification Search ........... 73/304 C
   See application file for complete search history.

(56) References Cited

U.S. PATENT DOCUMENTS 4,001,676 A    1/1977    Hile et al.
4,806,847 A    2/1989    Atherton et al.

FOREIGN PATENT DOCUMENTS

EP    0386965    3/1990
FR    2538542    12/1982

OTHER PUBLICATIONS

Abstract of Polish Patent P-301505 Dec. 14, 1993 1 page.
Abstract of Polish Patent P-349033 Jan. 25, 2000.

*Primary Examiner*—Hezron E. Williams
*Assistant Examiner*—Paul M West
(74) *Attorney, Agent, or Firm*—Horst M. Kasper

(57) ABSTRACT

The method of detecting the presence of a conducting or dielectric environment with dielectric constant higher than that of air, of this invention, consists in counting the number of control signals (No), resulting from the relationship No=f (Qp, Qod, Ucc, Up, T), sent from the control system (US) as necessary to charge the capacitor (Cp) and then to discharge the previously-charged capacitor (Cp) to a threshold voltage (Up) preset by the control system (US), with the subsequent counting of the number of control signals (Nx), resulting from the relationship Nx=f(Qp, Qx, Ucc, Up, T), sent from said control system (US) as necessary to charge the capacitor (Cx), and then the previously-charged capacitor (Cp) is discharged to said threshold voltage (Up) preset by said control system (US) and the quantities of determined control signals (Nx) are compared with the reference state and the obtained difference in those signals indicates the presence of a conductive or dielectric environment in the immediate environment of the capacitor (Cx).

10 Claims, 1 Drawing Sheet

Figure 1:
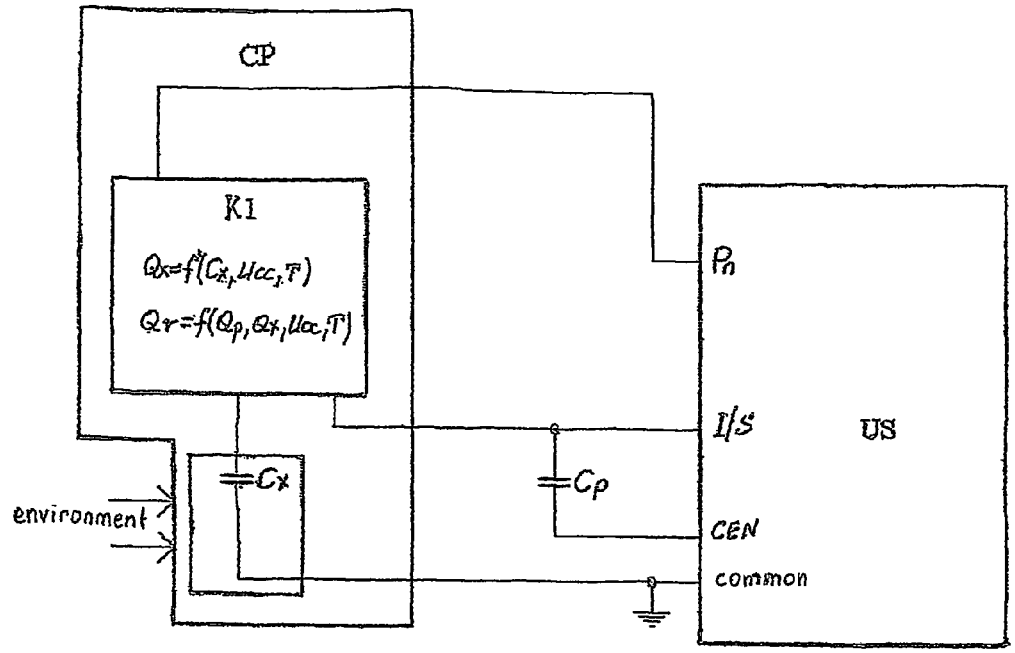

ELECTRONIC METHOD AND SYSTEM FOR DETECTION OF CONDUCTING OR DIELECTRIC MEDIUM WITH DIELECTRIC CONSTANT HIGHER THAN THAT OF AIR

The subject of this invention is the electronic method and system for detection of conducting or dielectric environment with dielectric constant higher than that of air, applicable in particular for continuous contactless electronic monitoring of the level of liquid foodstuffs and other liquids in containers.

The prior-art methods of gauging liquid levels in containers consist in introducing electronic-system electrodes to contact the gauged liquid. As a result the electric circuit is closed at certain liquid level and the liquid level is determined on that basis.

Also known are the capacitive electronic sensors with frequency generator having a capacitor of capacitance depending on the surrounding environment, whereas the presence of this environment is detected by measuring the capacitance of the capacitor through checking the frequency of the generator.

The liquid level indicator, known from the Polish patent application No. P-301505, contains an electronic unit and gauging tip, located in the lower part of the indicator body and contacting the sender and receiver of the electronic unit provided with contact set at its opposite side.

Also known from the Polish patent application No. P-327547, is the method of measuring the velocity and/or volume of flowing dielectric substance, especially in form of liquid, wherein the stream of dielectric substance is passed between capacitor plates of which one plate is divided to two parts by a slot transversal to the flow of the dielectric substance, and then both plates are connected electrically through a resistance. A constant power-supply voltage is maintained between capacitor plates and the voltage, and/or current flowing between parts of divided plate, is/are measured and then the velocity and/or volume of flowing dielectric substance is determined from suitable relationship.

Also known, from the Polish patent application No. P-349033, is the piezoelectric device for measurement of liquid level containing a detector provided with two piezoelectric cells combined with control elements for suitable emission of ultrasonic waves opposite a suitable reflective reference element located at a known distance from respective cell on one part and the higher liquid surface on the other, the processing element being adapted to determine the level of liquid using respective propagation times of ultrasonic waves emitted by each of those two cells. This unit contains elements which, on voltage supply to the unit, are able to determine the initiation phase (1100, 1100 bis), during which the control elements control the piezoelectric cells, so that the ratio between the reference cell excitation rhythm and level-measurement-cell rhythm is higher compared to the respective rhythms during the subsequent phase of stabilized measurement (1300).

The aim of this invention is to develop a method and electronic system for monitoring the level of liquids in containers of diverse uses through their electric insulation while simultaneously eliminating the contact of those liquids with measuring element as in case of electrodes or floats.

The essence of the method of detecting the presence of conducting or dielectric environment with dielectric constant higher than that of air according to this invention consists in counting of the number of reference control signals, which are a function of: electric charges collected on the measuring capacitor during its charging, electric charges collected on the reference capacitor during its charging with pulse control signal, power-supply voltage to the control unit that is a source of the current for charging the measuring and reference capacitors, the control-system preset voltage to which the measuring capacitor should discharge itself during counting of the reference control signals and the ambient temperature of said measuring capacitor and said reference capacitor, said signal being sent from said control system as necessary for charging of said measuring capacitor, and then the previously-charged measuring capacitor is discharged to a threshold voltage preset by said control system and, subsequently, the counting takes place of the number of control signals that depend on surrounding environment and are a resulting function of: electric charges collected on the measuring capacitor during its charging, electric charges collected on the capacitor, which is dependable on the surrounding environment, during its charging with pulse control signal, power-supply voltage to the control unit that is a source of the current for charging said measuring and reference capacitors, the control-system preset voltage to which the measuring capacitor should discharge itself during the counting of reference control signals, and the ambient temperature of the measuring capacitor and reference capacitor, said signals being sent from control system as necessary for charging of the capacitor dependable on the surrounding environment, and then the previously-charged measuring capacitor is discharged to the threshold voltage preset by said control system and, subsequently, a comparison takes place of determined control signals with their reference state, and the thus-obtained difference in those signals indicates the presence of conducting or dielectric environment that surrounds the capacitor influenced by this environment.

In turn, the electronic system for detecting the presence of conducting or dielectric environment with dielectric constant higher than that of air, according to this invention, consists of microprocessor control system having a measuring capacitor in its electric circuit, and electrically connected with measuring sensor consisting of first electronic key and the capacitor dependable on the surrounding, conductive or dielectric, environment, connected with it, whereas the control-system line, which constitutes the charging-current output of the capacitor dependable on the surrounding environment, as well as the input of the measuring-capacitor discharging current, is connected with said key, whereas the line of said system, constituting the output of/for the measuring-capacitor charging current as well as the input for voltage testing during discharging of said capacitor, is connected with said capacitor and with said key, whereas the line of said system, constituting both the input of the measuring-capacitor charging current and the output for the discharging current of said capacitor, is connected through said capacitor with the first electronic key, whereas the common of the control system is also connected with said key through said capacitor dependable on the surrounding environment.

In its other embodiment the electronic system contains additionally a reference sensor consisting of the second electronic key, connected with the control-system line, constituting the output of the measuring capacitor as well as the input for voltage testing during discharging of said capacitor, and the reference capacitor connected with said key, one pole of said reference capacitor being connected with the common of said system as well as, through the capacitor dependable on the surrounding environment, with said first electronic key, whereas the control-system line, which constitutes the charging-current output of the reference capacitor as well as the input of the measuring-capacitor discharging current, is connected with said second key of said electronic reference sensor.

The method and system of this invention enable easy and quick detection of the presence of conducting or dielectric environment with dielectric constant higher than that of air, whereas a simple housing case of the system enables its versatile applications, including households appliances, thermos-vessel outfit of gastronomic establishments and the automotive industry, to measure fuel contents in fuel tanks.

Figure 2:
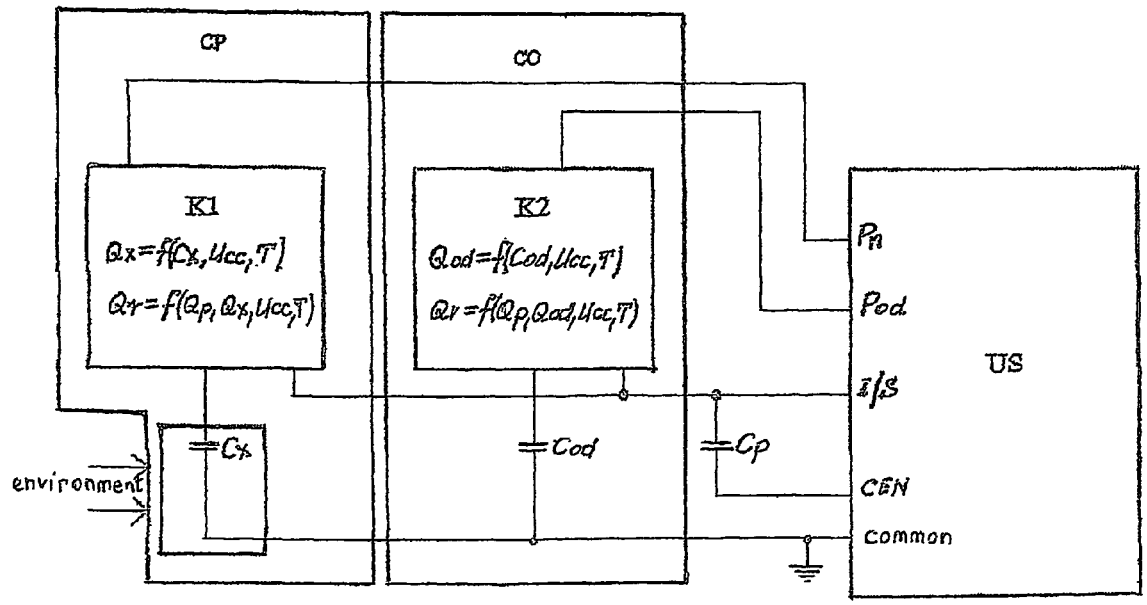

The subject of the invention is described in more detail on its embodiment examples of electronic systems for use of the method of this invention shown in figures, wherein FIG. 1 is a schematic block diagram of the electronic system for detection of the presence of conducting or dielectric environment with dielectric constant higher than that of air, consisting of a control system and measuring sensor, whereas FIG. 2 is a schematic block diagram of the electronic system for detection of the presence of conducting or dielectric environment with dielectric constant higher than that of air, consisting of control system, measuring sensor and reference sensor.

DETAILED DESCRIPTION

The electronic system presented in FIG. 1 consists of microprocessor control system US, having the capacitor Cp, in its electric circuit, and electrically connected with measuring sensor CP, consisting of the electronic key K1, and the capacitor Cx dependable on the surrounding, conductive or dielectric, environment, connected with it, whereas the line Pn, of said control system US, constituting the charging-current output of the capacitor Cx, as well as the discharging-current input of the capacitor Cp, is connected with key K1, whereas the line I/S of said system, constituting the output of/for the charging current of the capacitor Cp as well as the input for voltage testing during discharging of the capacitor Cp, is connected with said capacitor and with key K1, whereas the line CEN of said system, constituting both the input of the charging current of capacitor Cp and the output for the discharging current of said capacitor, is connected, through capacitor Cp, with key K1, whereas the common of the control system US is connected with key K1 through capacitor Cx.

The electronic system presented in FIG. 2 consists of microprocessor control system US, having the capacitor Cp, in its electric circuit, and electrically connected with the measuring sensor CP, consisting of the electronic key K1, and the capacitor Cx dependable on the surrounding, conductive or dielectric, environment, connected with it, whereas the line Pn, of the control system US, constituting the charging-current output of the capacitor Cx, as well as the discharging-current input of the capacitor Cp, is connected with key K1, whereas the line I/S of said system, constituting the output of/for the charging current of the capacitor Cp as well as the input for voltage testing during discharging of the capacitor Cp, is connected with said capacitor and with the key K1, whereas the line CEN of said system, constituting both the input of the charging current of capacitor Cp and the output for the discharging current of said capacitor, is connected, through capacitor Cp, with the key K1, whereas the common (frame) of the control system US is connected with key K1 through capacitor Cx.

Also, this embodiment of the system is additionally provided with the reference sensor CO consisting of the electronic key K2, connected with the line I/S of the control system US and to the reference capacitor Cod connected to said key, one pole of said reference capacitor being connected with the common of said system as well as, through the capacitor Cx, with K1, whereas the line I/S of the control system US, which constitutes the charging-current output of the reference capacitor Cod as well as the discharging-current input of the capacitor Cp, is connected the electronic key K2 of the reference sensor CO.

The principle of operation of the electronic system of this invention is that, once the supply voltage Ucc is switched ON in the control system US, electric charges Qp accumulate in capacitor Cp in the electric circuit: the output I/S of the control system US and the input CEN, and then the output I/S is switched over as the input for measuring of the voltage on the capacitor Cp. Simultaneously, the electronic keys K1 and K2 remain inactive because of no signals in lines Pn and Pod of the control system US.

Once the charging of capacitor Cp is finished, the electron key K1 remains inactive, while the electronic key K2 becomes activated with cyclic rectangular signal No through the line Pod and said key K2 causes a switching enabling accumulation of charges Qod in the capacitor Cod, according to the relationship: Qod=f(Cod, Ucc, T), the source of which is high level of control signal in the circuit: the output Pod of the control system US, the electronic key K2, the capacitor Cod, and the common of the control system US.

After a specific time the low level of the control signal causes a switching of the electronic key K2 to the discharge condition of the capacitor Cp, according to the relationship Qr=f(Qp, Cod, Ucc, T) in the circuit: the capacitor Cp, key K2, the line Pod of the control system US and the line CEN is such manner that the quantity of charges flowing off the capacitor Cp depends on the quantity of charges collected in the capacitor Cod during its charging. Such pulse-like discharge of capacitor causes a step-wise drop in the voltage on/in the capacitor Cp, which is monitored and compared by the control system US with the level of the threshold voltage Up. The control system US sends so many control signals No depending on (Qp, Qod, Ucc, Up, T) until the voltage on this capacitor reaches the level of the threshold voltage Up preset on/by the control system US, said signals being subject to counting and saving as No.

Then the cycle is repeated from the re-collecting of charges in the capacitor Cp in which the key K2 remains inactive and key K1 becomes activated with cyclic rectangular signal Nx through the line Pn and said key K1 causes a switching enabling the accumulation of charges Qx in the capacitor Cx, according to the relationship: Qx=f(Cx, Ucc, T), the source of which is high level of control signal, whereas the quantity of collected charges depends on the environment surrounding the capacitor Cx, in particular its dielectric constant in the circuit: the output Pn of the control system US, the electronic key K1, the capacitor Cx, and the common of the control system US.

After a specific time the low level of the control signal causes a switching of the electronic key K1 to the discharge condition of the capacitor Cp according to the relationship Qr=f(Qp, Cx, Ucc, T) in the circuit: the capacitor Cp, key K1, the line Pn of the control system US and the line CEN is such manner that the quantity of charges flowing off the capacitor Cp depends on the quantity of charges Qx collected in the capacitor Cx during its charging, thus causing a step-wise drop in the voltage on/in the capacitor Cx, which is monitored and compared by the control system US with the level of the threshold voltage Up. The control system US sends so many control signals Nx depending on (Qp, Qx, Ucc, Up, T) until the voltage on this capacitor reaches the level of the voltage Up preset on/by the control system US.

Said signals are subject to simultaneous counting and saving as Nx, and then a comparison takes place of the recorded quantity of control signals No and Nx and the results serves as the basis for the control system US to signal the presence of conducting or dielectric environment around the capacitor Cx.

It is also possible to detect the conducting or dielectric environment in the vicinity of the capacitor Cx in a single measuring cycle, i.e. without the use of the reference sensor CO, the key K2, and the capacitor Cod.

However in this case the base reference is the counted quantity of control signals No necessary for discharging the capacitor Cp and charging the capacitor Cx when air is the environment surrounding the capacitor Cx. That quantity of signals No is saved and, after each measuring cycle in which the presence of dielectric environment is checked, it is compared with the quantity of counted signals Nx and on this basis the control system US signals the presence of conducting or dielectric environment in the vicinity of the capacitor Cx.

What is claimed is:

1. Electronic system for detection of the presence of a conducting, or dielectric environment with dielectric constant higher than that of air, having a measuring sensor with capacitor characteristics wherein it consists of a microprocessor control system (US) having in its electrical circuit a capacitor (Cp) electrically connected with the measuring sensor (CP) consisting of an electronic key (K1) and a capacitor (Cx) dependable on the surrounding, conductive or dielectric, environment, connected to said key (K1), wherein a line (Pn) of the control system (US), constituting the charging-current output of the capacitor (Cx) as well as the discharge-current input of the capacitor (Cp), is connected with the key (K1), a line (I/S), constituting the charging-current output of the capacitor (Cp) as well as the input for voltage testing during discharging of the capacitor (Cp), is connected with said capacitor and with key (K1), wherein a line (CEN) of said system, constituting both the charging-current input for capacitor (Cp) and discharge-current output of said capacitor, is also connected through capacitor (Cp) with said key, whereas a common (frame) of the, control system (US) is connected through capacitor (Cx) with key (K1);

wherein the electronic system has additional reference sensor (CO) consisting of an electronic key (K2) connected to the line (I/S) of the control system (US) and, connected with said key, a reference capacitor (Cod) with one pole connected to common of said system and, through capacitor (Cx), to the key (K1), whereas a line (Pod) of the control system (US) constituting the charging-current output of the reference capacitor (Cod) as well as the discharge-current input of the capacitor (Cp), is connected with the key (K2) of the reference sensor.

2. A method of detecting a presence of a conducting or dielectric environment with a dielectric constant higher than that of air comprising furnishing a measuring sensor (CP) including an electronic measurement key (K1) and a measurement capacitor (Cx);

using the measuring sensor;

sending reference control signals from a microprocessor control system (US) as necessary to charge a charging capacitor (Cp);

counting a number of reference control signals (No), resulting from the relationship No=f(Qp, Qod, Ucc, Up, T), then discharging the previously-charged charging capacitor (Cp) to a threshold voltage (Up) preset by said microprocessor control system (US);

sending measurement control signals (Nx) from said microprocessor control system (US) as necessary to charge a measurement capacitor (Cx);

subsequently counting of a number of measurement control signals (Nx), resulting from the relationship Nx=f(Qp, Qx, Ucc, Up, T);

then discharging the previously-charged charging capacitor (Cp) to said threshold voltage (Up) preset by the microprocessor control system (US), where;

Qp—means the electric charge(s) collected in charging capacitor (Cp) during its charging Qod—means the electric charge(s) collected in a reference capacitor Cod during its charging with reference control signal (No)

Qx—means the electric charge(s) collected in the reference capacitor (Cx), depending on the surrounding environment, during its charging with measurement control signal (Nx);

Ucc—means, the supply voltage to the microprocessor control system (US) and the charging voltage of the charging capacitor (Cp), the measurement capacitor (Cx) and the reference capacitor (Cod);

Up—means the voltage set by the microprocessor control system (US) to which the charging capacitor (Cp) should be discharged while counting the reference control signals (No) and the measurement control signals (Nx);

T—means the ambient temperature at which the charging capacitor (Cp) and the measurement capacitor (Cx) and a remaining element of the microprocessor control system (US) are counting the discharge cycles of the charging capacitor (Cp);

subsequently comparing a number of determined measurement control signals (Nx) with a number of reference control signals (No);

obtaining a difference in those signals for indicating a presence of a conductive or dielectric environment in an immediate environment of the measurement capacitor (Cx);

accumulating electric charges (Qp) in the charging capacitor (Cp);

maintaining a measurement line (Pn) free from signals and thereby the electronic measurement key (K1) inactive;

maintaining a reference line (Pod) free from signals and thereby an electronic reference key (K2) inactive;

charging the reference line (Pod) with a cyclic rectangular signal;

activating the electronic reference key (K2);

causing a switching of the electronic reference key (K2);

enabling accumulation of charges (Qod) in a reference capacitor (Cod).

3. A method of detecting a presence of a conducting or dielectric environment with a dielectric constant higher than that of air comprising furnishing a measuring sensor (CP) including an electronic measurement key (K1) and a measurement capacitor (Cx);

using the measuring sensor;

sending reference control signals from a microprocessor control system (US) as necessary to charge a charging capacitor (Cp);

counting a number of reference control signals (No), resulting from the relationship No=f(Qp, Qod, Ucc, Up, T), then discharging the previously-charged charging capacitor (Cp) to a threshold voltage (Up) preset by said microprocessor control system (US);

sending measurement control signals (Nx) from said microprocessor control system (US) as necessary to charge a measurement capacitor (Cx);

subsequently counting of a number of measurement control signals (Nx), resulting from the relationship Nx=f (Qp, Ox, Ucc, Up, T);

then discharging the previously-charged charging capacitor (Cp) to said threshold voltage (Up) preset by the microprocessor control system (US), where;

Qp—means the electric charge(s) collected in charging capacitor (Cp) during its charging Qod—means the electric charge(s) collected in a reference capacitor Cod during its charging with reference control signal (No)

Qx—means the electric charge(s) collected in the reference capacitor (Cx), depending on the surrounding environment, during its charging with measurement control signal (Nx);

Ucc—means, the supply voltage to the microprocessor control system (US) and the charging voltage of the charging capacitor (Cp), the measurement capacitor (Cx) and the reference capacitor (Cod);

Up—means the voltage set by the microprocessor control system (US) to which the charging capacitor (Cp) should be discharged while counting the reference control signals (No) and the measurement control signals (Nx);

T—means the ambient temperature at which the charging capacitor (Cp) and the measurement capacitor (Cx) and a remaining element of the microprocessor control system (US) are counting the discharge cycles of the charging capacitor (Cp);

subsequently comparing a number of determined measurement control signals (Nx) with a number of reference control signals (No);

obtaining a difference in those signals for indicating a presence of a conductive or dielectric environment in an immediate environment of the measurement capacitor (Cx);

switching an electronic reference key (K2) to a discharge condition of the charging capacitor (Cp);

furnishing that the quantity of charges flowing off the charging capacitor (Cp) depends on the quantity of charges collected in a reference capacitor (Cod) during its charging;

causing a step-wise drop in the voltage of the charging capacitor (Cp);

monitoring the step-wise drop in the voltage by the microprocessor control system (US) relative to the threshold voltage (Up);

sending so many reference control signals (No) by the microprocessor control system until the voltage on the charging capacitor (Cp) reaches a level of the threshold voltage (Up) present on the microprocessor control system (US); and counting the reference control signals (No).

4. The method of detecting a presence of a certain environment according to claim 3 further comprising charging the measurement line (Pn) with cyclic rectangular signals (Nx);

activating the electronic measurement key (K1);

causing a switching;

enabling an accumulation of charges (Qx) in the measurement capacitor (Cx) and wherein the quantuty of collected charges depends on the environment surrounding the measurement capacitor (Cx).

5. A method of detecting a presence of a conducting or dielectric environment with a dielectric constant higher than that of air comprising furnishing a measuring sensor (CP) including an electronic measurement key (K1) and a measurement capacitor (Cx);

using the measuring sensor;

sending reference control signals from a microprocessor control system (US) as necessary to charge a charging capacitor (Cp);

counting a number of reference control signals (No), resulting from the relationship No=f(Qp, Qod, Ucc, Up, T), then discharging the previously-charged charging capacitor (Cp) to a threshold voltage (Up) preset by said microprocessor control system (US);

sending measurement control signals (Nx) from said microprocessor control system (US) as necessary to charge a measurement capacitor (Cx);

subsequently counting of a number of measurement control signals (Nx), resulting from the relationship Nx=f (Qp, Qx, Ucc, Up, T);

then discharging the previously-charged charging capacitor (Cp) to said threshold voltage (Up) preset by the microprocessor control system (US), where:

Qp—means the electric charge(s) collected in charging capacitor (Cp) during its charging Qod—means the electric charge(s) collected in a reference capacitor Cod during its charging with reference control signal (No)

Qx—means the electric charge(s) collected in the reference capacitor (Cx), depending on the surrounding environment, during its charging with measurement control signal (Nx);

Ucc—means, the supply voltage to the microprocessor control system (US) and the charging voltage of the charging capacitor (Cp), the measurement capacitor (Cx) and the reference capacitor (Cod);

Up—means the voltage set by the microprocessor control system (US) to which the charging capacitor (Cp) should be discharged while counting the reference control signals (No) and the measurement control signals (Nx);

T—means the ambient temperature at which the charging capacitor (Cp) and the measurement capacitor (Cx) and a remaining element of the microprocessor control system (US) are counting the discharge cycles of the charging capacitor (Cp);

subsequently comparing a number of determined measurement control signals (Nx) with a number of reference control signals (No);

obtaining a difference in those signals for indicating a presence of a conductive or dielectric environment in an immediate environment of the measurement capacitor (Cx);

switching the electronic measurement key (K1) to a discharge condition of the charging capacitor (Cp);

furnishing that the quantity of charges flowing off the charging capacitor (Cp) depends on the quantity of measurement charges (Qx) collected in the measurement capacitor (Cx) during its charging;

causing a step-wise drop in the voltage of the charging capacitor (Cp);

monitoring the step-wise drop in the voltage by the microprocessor control system (US) relative to the threshold voltage (Up);

sending so many measurement control signals (Nx) by the microprocessor control system (US) until the voltage on the measurement capacitor (Cx) reaches a level of the threshold voltage (Up) present on the microprocessor control system (US); and counting the measurement control signals (Nx).

6. A method of detecting a presence of a conducting or dielectric environment with a dielectric constant higher than that of air comprising furnishing a measuring sensor (CP) including an electronic measurement key (K1) and a measurement capacitor (Cx);

using the measuring sensor;

sending reference control signals from a microprocessor control system (US) as necessary to charge a charging capacitor (Cp);

counting a number of reference control signals (No), resulting from the relationship No=f(Qp, Qod, Ucc, Up, T), then discharging the previously-charged charging capacitor (Cp) to a threshold voltage (Up) preset by said microprocessor control system (US);

sending measurement control signals (Nx) from said microprocessor control system (US) as necessary to charge a measurement capacitor (Cx);

subsequently counting of a number of measurement control signals (Nx), resulting from the relationship Nx=f (Qp, Qx, Ucc, Up, T);

then discharging the previously-charged charging capacitor (Cp) to said threshold voltage (Up) preset by the microprocessor control system (US), where:

Qp—means the electric charge(s) collected in charging capacitor (Cp) during its charging Qod—means the electric charge(s) collected in a reference capacitor Cod during its charging with reference control signal (No)

Qx—means the electric charge(s) collected in the reference capacitor (Cx), depending on the surrounding environment, during its charging with measurement control signal (Nx);

Ucc—means, the supply voltage to the microprocessor control system (US) and the charging voltage of the charging capacitor (Cp), the measurement capacitor (Cx) and the reference capacitor (Cod);

Up—means the voltage set by the microprocessor control system (US) to which the charging capacitor (Cp) should be discharged while counting the reference control signals (No) and the measurement control signals (Nx);

T—means the ambient temperature at which the charging capacitor (Cp) and the measurement capacitor (Cx) and a remaining element of the microprocessor control system (US) are counting the discharge cycles of the charging capacitor (Cp);

subsequently comparing a number of determined measurement control signals (Nx) with a number of reference control signals (No);

obtaining a difference in those signals for indicating a presence of a conductive or dielectric environment in an immediate environment of the measurement capacitor (Cx);

comparing a recorded quantity of reference control signals (No) with a recorded quantity of measurement control signals (Nx);

obtaining a comparison result;

employing the comparison result as a basis for the microprocessor control system (US);

signalling with the microprocessor control system (US) a presence of a conducting or dielectric environment around the measurement capacitor (Cx).

7. A method of detecting a presence of a conducting or dielectric environment with a dielectric constant higher than that of air comprising furnishing a measuring sensor (CP) including an electronic measurement key (K1) and a measurement capacitor (Cx);

using the measuring sensor;

sending reference control signals from a microprocessor control system (US) as necessary to charge a charging capacitor (Cp);

counting a number of reference control signals (No), resulting from the relationship No=f(Qp, Qod, Ucc, Up, T), then discharging the previously-charged charging capacitor (Cp) to a threshold voltage (Up) preset by said microprocessor control system (US);

sending measurement control signals (Nx) from said microprocessor control system (US) as necessary to charge a measurement capacitor (Cx);

subsequently counting of a number of measurement control signals (Nx), resulting from the relationship Nx=f (Qp, Qx, Ucc, Up, T);

then discharging the previously-charged charging capacitor (Cp) to said threshold voltage (Up) preset by the microprocessor control system (US), where:

Qp—means the electric charge(s) collected in charging capacitor (Cp) during its charging Qod—means the electric charge(s) collected in a reference capacitor Cod during its charging with reference control signal (No)

Qx—means the electric charge(s) collected in the reference capacitor (Cx), depending on the surrounding environment, during its charging with measurement control signal (Nx);

Ucc—means, the supply voltage to the microprocessor control system (US) and the charging voltage of the charging capacitor (Cp), the measurement capacitor (Cx) and the reference capacitor (Cod);

Up—means the voltage set by the microprocessor control system (US) to which the charging capacitor (Cp) should be discharged while counting the reference control signals (No) and the measurement control signals (Nx);

T—means the ambient temperature at which the charging capacitor (Cp) and the measurement capacitor (Cx) and a remaining element of the microprocessor control system (US) are counting the discharge cycles of the charging capacitor (Cp);

subsequently comparing a number of determined measurement control signals (Nx) with a number of reference control signals (No);

obtaining a difference in those signals for indicating a presence of a conductive or dielectric environment in an immediate environment of the measurement capacitor (Cx);

counting a quantity of reference control signals (No) necessary for discharging the charging capacitor (Cp);

charging the measurement capacitor (Cx) when air is the environment surrounding the measurement capacitor (Cx);

counting a number of reference control signals (No);

saving the number of reference control signals (No);

checking a presence of a dielectric environment;

counting measurement control signals (Nx);

comparing a quantity of measurement control signals (Nx) with a quantity of reference control signals (No);

signaling by the microprocessor control system (US) the presence of a conducting or dielectric environment in a vicinity of the measurement capacitor (Cx) based on a result of the comparing step.

8. An electronic system for a detection of a presence of a conducting, or dielectric environment with a dielectric constant higher than that of air comprising a microprocessor control system (US) having a voltage input Ucc;

a charging capacitor (Cp) electrically connected to the microprocessor control system (US);

an electronic measurement key (K1); and a measurement capacitor (Cx) depending on a surrounding, conductive or dielectric, environment, and having a first polarity connected to said electronic measurement key (K1), wherein the electronic measurement key (K1) and the measurement capacitor (Cx) form a measuring sensor (CP);

a measurement line (Pn) connecting the microprocessor control system (US) to the electronic measurement key (K1) and constituting a charging-current output of the measurement capacitor (Cx) as well as the discharge-current input of the charging capacitor (CP);

a first charging line (I/S) connecting the microprocessor control system to a first polarity of the charging capacitor (Cp) and to the electronic measurement key (K1), and constituting the charging-current output of the charging capacitor (Cp) as well as an input for voltage testing during discharging of the charging capacitor (Cp);

a second charging line (CEN) connecting the microprocessor control system (US) to a second polarity of the charging capacitor (Cp), and constituting both the charging-current input for capacitor (Cp) and discharge-current output of said capacitor, wherein the second charging line (CEN) is also indirectly connected through the charging capacitor (Cp) with the electronic measurement key (K1), a common ground line connecting the microprocessor control system (US) to a second polarity of the measurement capacitor (Cx) and wherein the microprocessor control system (US) is connected through the measurement capacitor (Cx) with the electronic measurement key (K1).

9. The electronic system according to claim 8 further comprising an electronic reference key (K2) connected to the first charging line (I/S) and therewith to the microprocessor control system (US);

a reference capacitor (Cod) having a first polarity connected to the electronic reference key (K2) and having a second polarity connected to the common ground line and, through the measurement capacitor (Cx), to the electronic measurement key (K1), wherein the electronic reference key (K2) and the reference capacitor form a reference sensor (CO);

a reference line (Pod) connecting the microprocessor control system (US) to the electronic reference key (K2) and constituting a charging-current output of the reference capacitor (Cod) as well as a discharge-current input of the charging capacitor (Cp).

10. The electronic system according to claim 8 wherein the measurement line (Pn) constitutes a charge current output of the measurement capacitor (Cx);

wherein the measurement line (Pn) constitutes a discharge current input of the charging capacitor (Cp);

wherein the first charging line (I/S) constitutes an output of/for the charging current of the charging capacitor (Cp) as well as an input for voltage testing during discharging of the charging capacitor (Cp);

wherein the second charging line (CEN) constitutes both the input of the charging current of the charging capacitor (Cp) and the output for the discharging current of the charging capacitor (Cp).

\* \* \* \* \*

UNITED STATES PATENT AND TRADEMARK OFFICE
CERTIFICATE OF CORRECTION

PATENT NO. : 7,401,513 B2  Page 1 of 1
APPLICATION NO. : 10/545129
DATED : July 22, 2008
INVENTOR(S) : Zbigniew Szela et al.

It is certified that error appears in the above-identified patent and that said Letters Patent is hereby corrected as shown below:

On the title page item (75), should read: Zbigniew Szela, Bledowa Tyczynska (PL);
Kazimierz Zajac, Rzeszow (PL);
Wlodzimierz Kalita, Rzeszow (PL);
Zbigniew Lasota, Warszawa (PL);
Michal Lasota, Warszawa (PL)

On the title page item (73), should read: Elektoniczny Zaklad Innowacyjno-Wdrozeniowy
"Hybres" S.p. z o.o, Rzeszòw (PL)

Signed and Sealed this

Sixteenth Day of March, 2010

David J. Kappos
*Director of the United States Patent and Trademark Office*